(12) United States Patent
Abgrall

(10) Patent No.: US 6,373,498 B1
(45) Date of Patent: Apr. 16, 2002

(54) DISPLAYING IMAGES DURING BOOT-UP AND SHUTDOWN

(75) Inventor: Jean-Paul Abgrall, San Jose, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,003

(22) Filed: Jun. 18, 1999

(51) Int. Cl.$^7$ ................................................ G09G 5/34
(52) U.S. Cl. .................................................... 345/619
(58) Field of Search ........................... 345/133, 24, 592, 345/619, 765, 778, 811; 711/205, 207; 713/1, 2; 714/36

(56) References Cited

U.S. PATENT DOCUMENTS

| | | |
|---|---|---|
| 5,121,345 A | 6/1992 | Lentz |
| 5,128,995 A | 7/1992 | Arnold et al. |
| 5,131,089 A | 7/1992 | Cole |
| 5,142,680 A | 8/1992 | Ottman et al. |
| 5,146,568 A | 9/1992 | Flaherty et al. |
| 5,214,695 A | 5/1993 | Arnold et al. |
| 5,274,816 A | 12/1993 | Oka |
| 5,280,627 A | 1/1994 | Flaherty et al. |
| 5,307,497 A | 4/1994 | Feigenbaum et al. |
| 5,325,532 A | 6/1994 | Crosswy et al. |
| 5,379,431 A | 1/1995 | Lemon et al. |
| 5,381,549 A | 1/1995 | Tamura |
| 5,418,918 A | 5/1995 | Vander Kamp et al. |
| 5,444,850 A | 8/1995 | Chang |
| 5,448,741 A | 9/1995 | Oka |
| 5,452,454 A | 9/1995 | Basu |
| 5,463,766 A | 10/1995 | Schieve et al. |
| 5,469,573 A | 11/1995 | McGill, III et al. |
| 5,504,905 A | 4/1996 | Cleary et al. |
| 5,522,076 A | 5/1996 | Dewa et al. |
| 5,526,523 A | 6/1996 | Straub et al. |
| 5,542,082 A | 7/1996 | Solhjell |
| 5,581,740 A | 12/1996 | Jones |
| 5,586,327 A | 12/1996 | Bealkowski et al. |
| 5,594,903 A | 1/1997 | Bunnell et al. |
| 5,604,890 A | 2/1997 | Miller |
| 5,652,868 A | 7/1997 | Williams |
| 5,652,886 A | 7/1997 | Tulpule et al. |
| 5,664,194 A | 9/1997 | Paulsen |
| 5,680,547 A | 10/1997 | Chang |
| 5,692,190 A | 11/1997 | Williams |
| 5,694,583 A | 12/1997 | Williams et al. |
| 5,694,600 A | 12/1997 | Khenson et al. |
| 5,701,477 A | 12/1997 | Chejlava, Jr. |
| 5,715,456 A | 2/1998 | Bennett et al. |
| 5,717,930 A | 2/1998 | Imai et al. |
| 5,727,213 A | 3/1998 | Vander Kamp et al. |
| 5,732,268 A | 3/1998 | Bizzarri |
| 5,748,957 A | 5/1998 | Klein |
| 5,754,853 A | 5/1998 | Pearce |
| 5,764,593 A | 6/1998 | Turpin et al. |
| 5,781,758 A | 7/1998 | Morley |
| 5,790,849 A | 8/1998 | Crocker et al. |
| 5,796,984 A | 8/1998 | Pearce et al. |
| 5,802,363 A | 9/1998 | Williams et al. |
| 5,805,880 A | 9/1998 | Pearce et al. |
| 5,805,882 A | 9/1998 | Cooper et al. |
| 5,815,706 A | 9/1998 | Stewart et al. |
| 5,819,063 A | 10/1998 | Dahl et al. |
| 5,828,888 A | 10/1998 | Kozaki et al. |
| 5,832,251 A | 10/1998 | Takahashi |
| 5,842,011 A | 11/1998 | Basu |
| 5,854,905 A | 12/1998 | Garney |
| 5,864,698 A | 1/1999 | Krau et al. |
| 5,887,164 A | 3/1999 | Gupta |
| 5,901,310 A | 5/1999 | Rahman et al. |
| 5,907,679 A | 5/1999 | Hoang et al. |
| 6,049,871 A * | 4/2000 | Silen et al. .................... 713/2 |
| 6,205,450 B1 * | 3/2001 | Kanome ..................... 707/203 |

* cited by examiner

Primary Examiner—Almis R. Jankus
Assistant Examiner—J. F. Cunningham

(57) ABSTRACT

The present invention is a method and apparatus to display an image during a transition of an operating system in a computer system. An image having an image format compatible with the operating system is obtained. Content of a system file corresponding to the transition of the operating system is created using the image in a system directory.

45 Claims, 8 Drawing Sheets

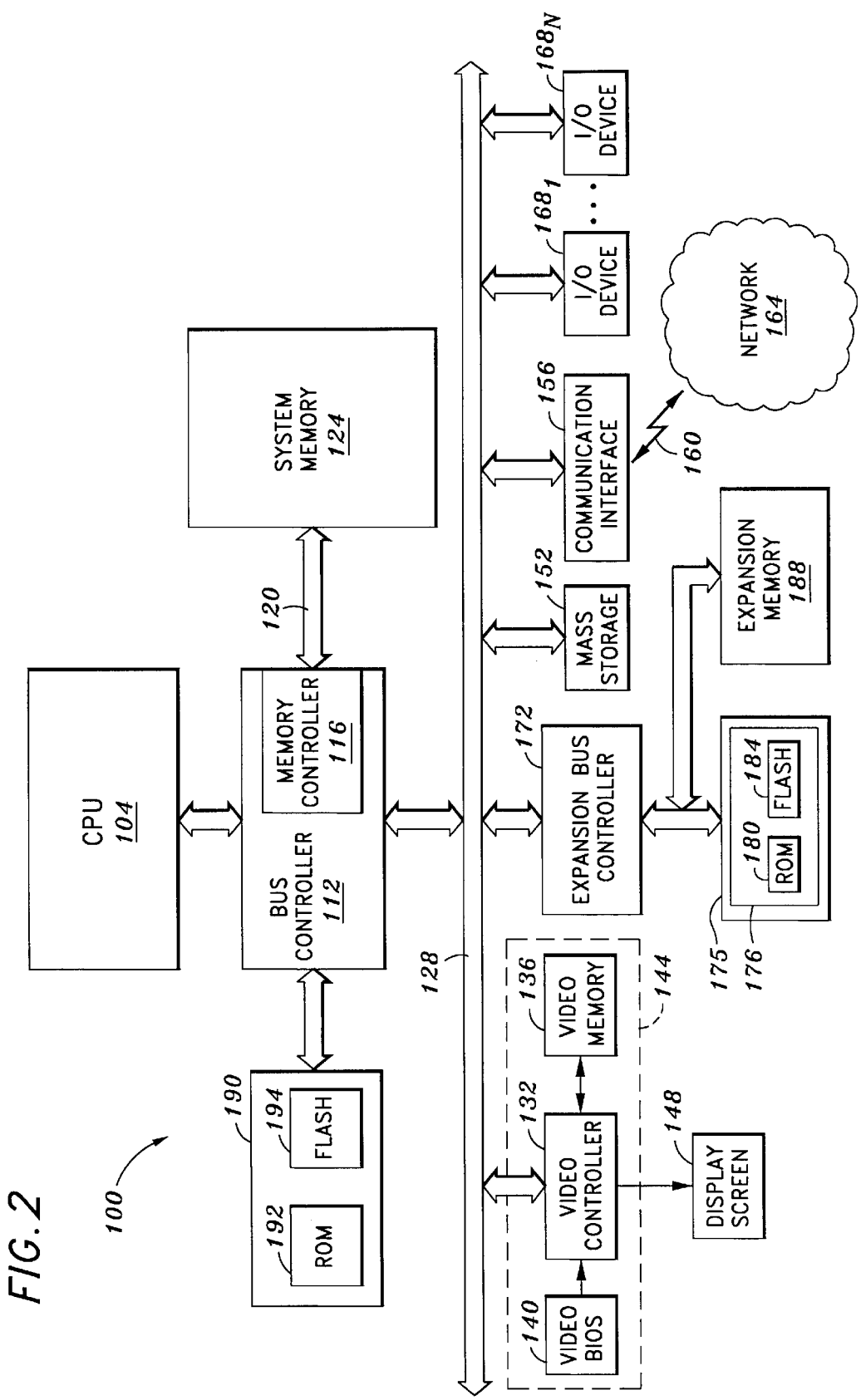

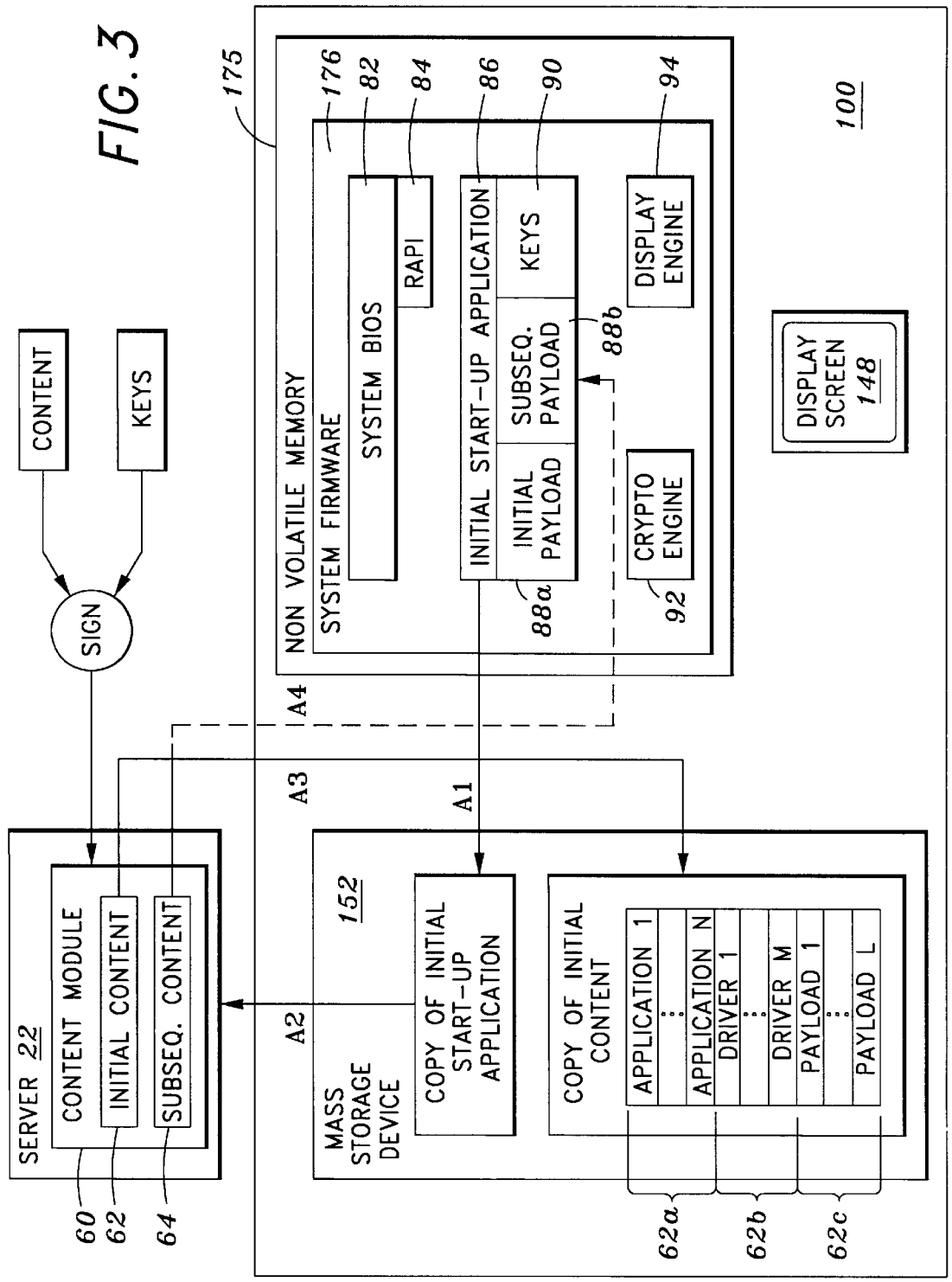

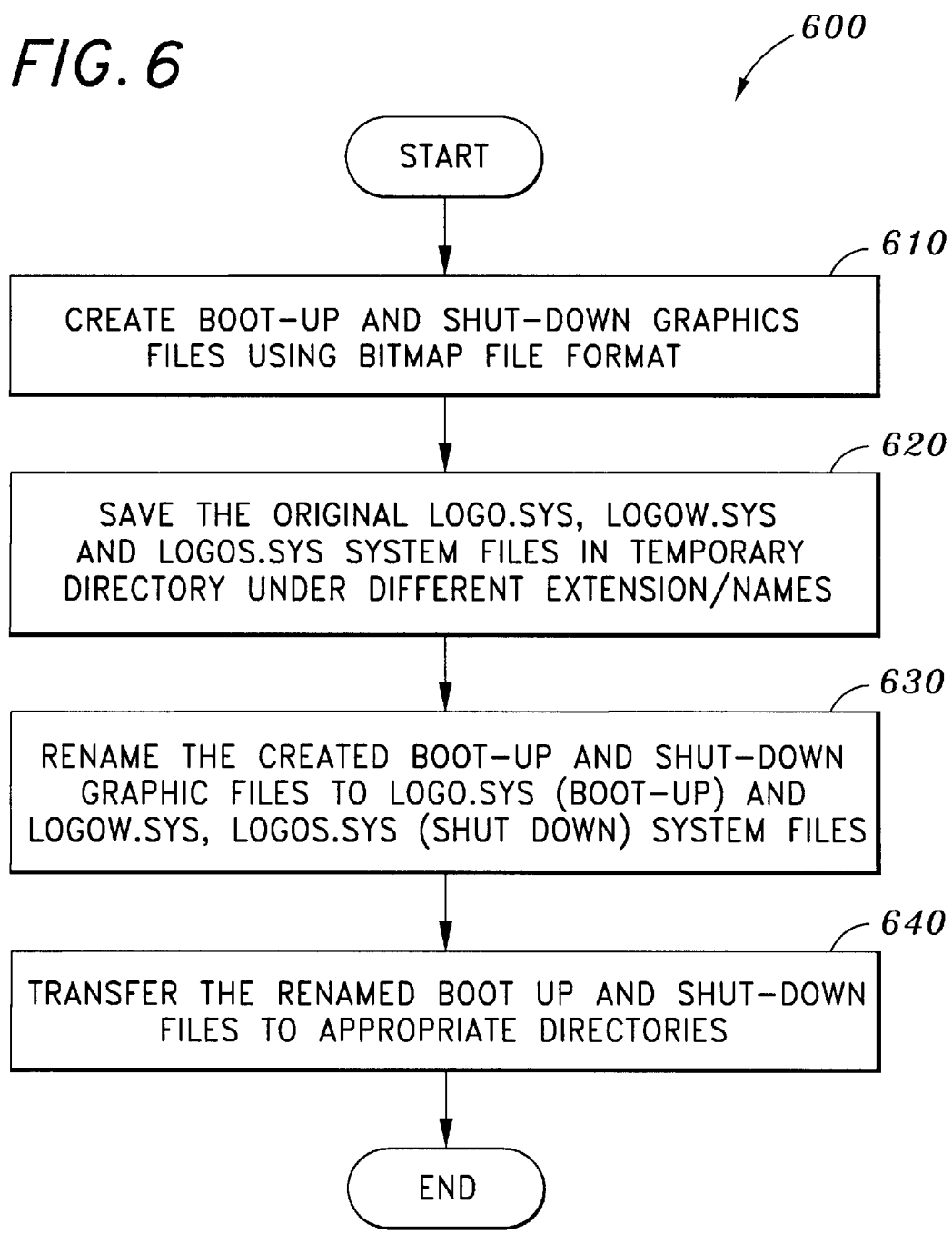

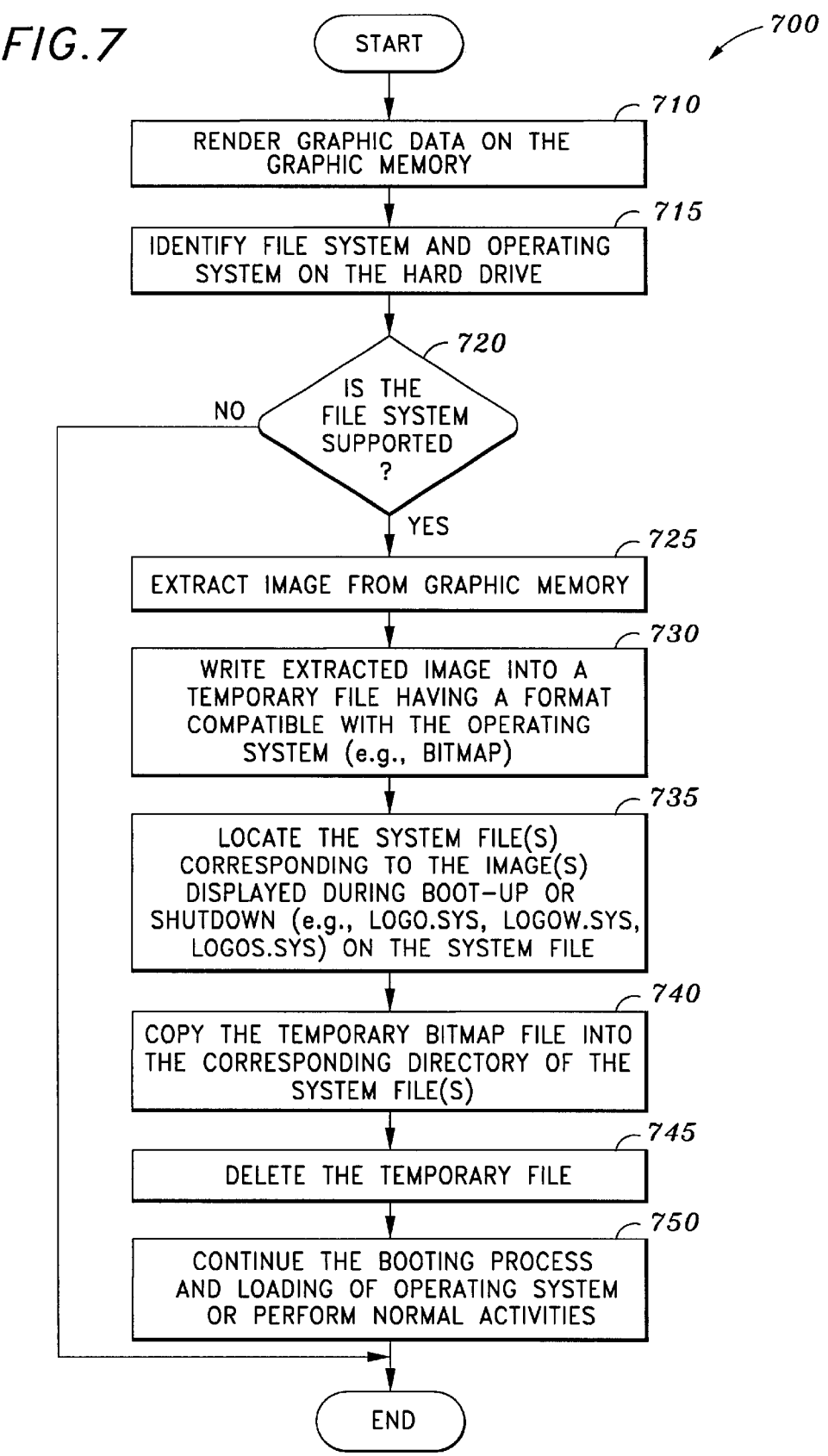

DISPLAYING IMAGES DURING BOOT-UP AND SHUTDOWN

BACKGROUND

1. Field of the Invention

This invention relates to graphics. In particular, the invention relates to graphic display.

2. Description of Related Art

A typical process of loading an operating system (OS) from a basic input and output system (BIOS) takes some time to complete. During this time, typically the display screen displays an image as selected by the operating system. This image is fixed and is not changed by the OS. Similarly, when the system is shutdown, the OS goes through a shutdown sequence and displays images on the screen during the shutdown process. The boot-up and shutdown images as displayed by the OS are normally not useful to the user and merely contain routine messages.

Since the time to boot up and shut down is sufficiently long for the system to display more informative images, it is desirable to be able to display images other than the standard logos of the operating system.

Therefore there is a need in the technology to provide a simple and efficient method to display an image during a transition of the operating system.

SUMMARY

The present invention is a method and apparatus to display an image during a transition of an operating system in a computer system. An image having an image format compatible with the operating system is obtained. Content of a system file corresponding to the transition of the operating system is created using the image in a system directory.

BRIEF DESCRIPTION OF THE DRAWINGS

The features and advantages of the present invention will become apparent from the following detailed description of the present invention in which:

FIG. 2 illustrates an exemplary processor system or user computer system which implements embodiments of the present invention.

FIG. 3 illustrates a logical diagram of one embodiment of the invention.

FIG. 6 is a flowchart illustrating a process to display an image during a transition of the operating system according to one embodiment of the invention.

FIG. 7 is a flowchart illustrating a process to display an image during a transition of the operating system according to another embodiment of the invention.

DESCRIPTION

Figure 1:
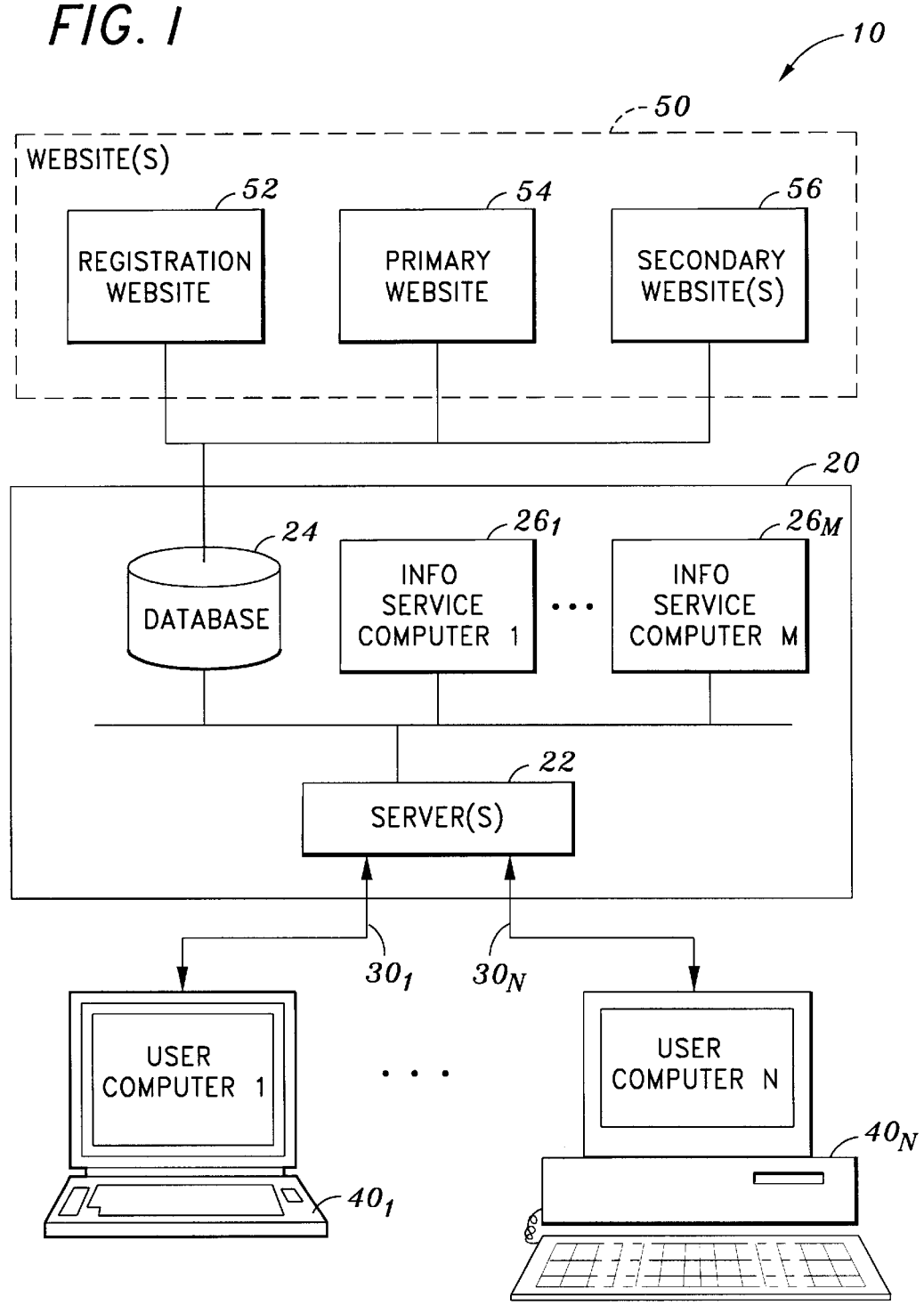
FIG. 1 is a system block diagram of one embodiment of an information distribution system in which the apparatus and method of the invention is used.

The present invention is a method and apparatus to display an image during a transition of an operating system such as boot-up and shutdown. A boot-up graphic file replaces a boot-up system file in a system directory. A shutdown graphic file replaces a shutdown system file in a system directory. The technique allows the display of images other than the standard images by the operating system.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as, articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No 09/336,289, entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capacity media device, and/or any combination thereof. The expansion bus controller 172 is coupled to non-volatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2,OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84 provides a secure interface between ROM application programs and system BIOS 82. The RAPI 84, ISUA 86, and initial payload 88a may each be separately developed and stored in the system firmware 176 prior to initial use of the computer system 100. In one embodiment, the RAPI 84, ISUA 86, and initial payload 88 each includes proprietary software developed by Phoenix Technologies, Ltd. One embodiment of RAPI 84 is described in co-pending U.S. patent application Ser. No. 09/336,889 entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289 entitled "Method and Apparatus for Automatically Installing and Configuring Software on a Computer," filed on Jun. 18, 1999, assigned to Phoenix Technologies, Ltd., and which is incorporated herein by reference.

Figure 4A:
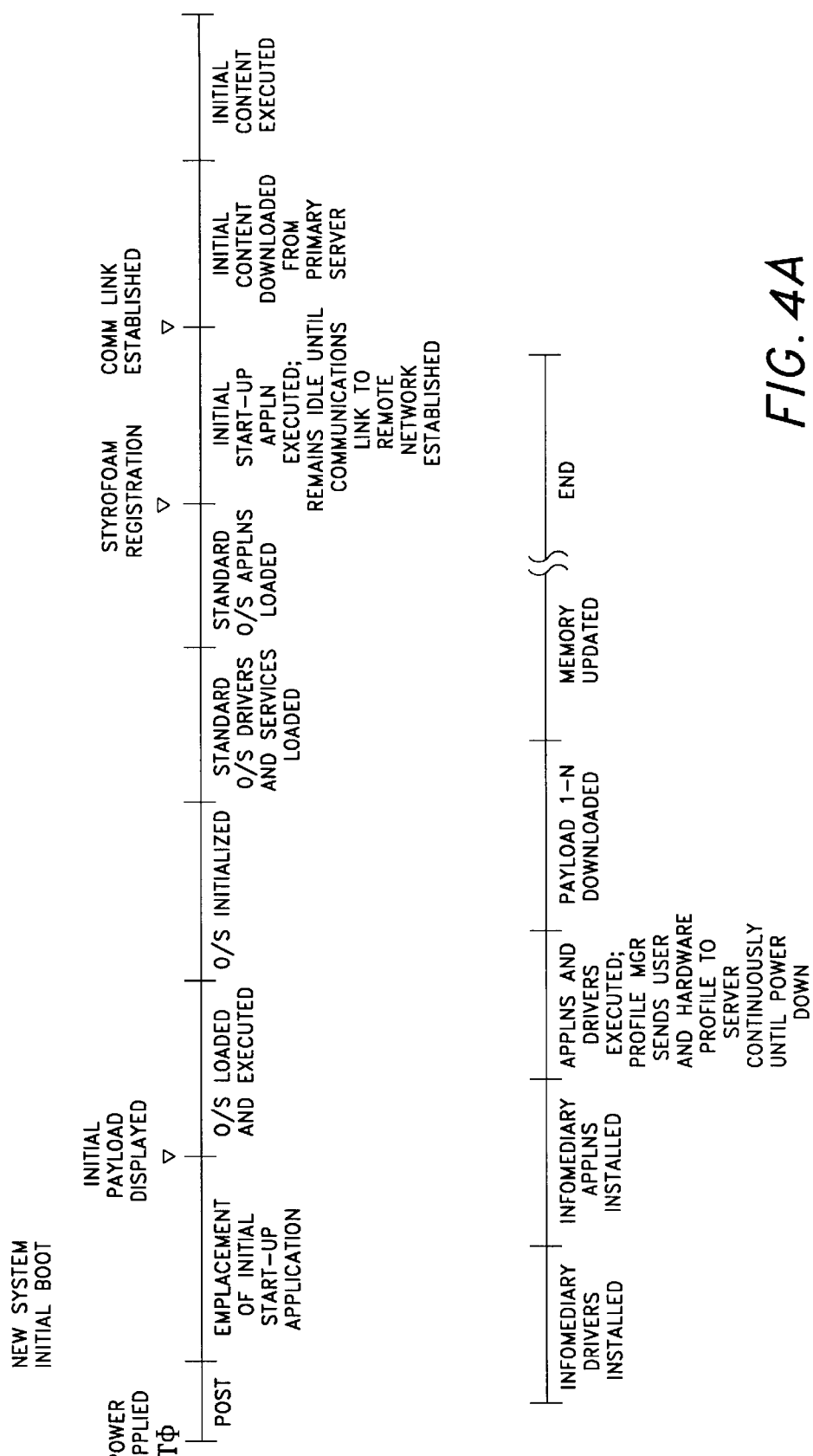
FIG. 4A and FIG. 4B illustrates one embodiment of a process flow chart provided in accordance with the principles of the invention.
Figure 4B:
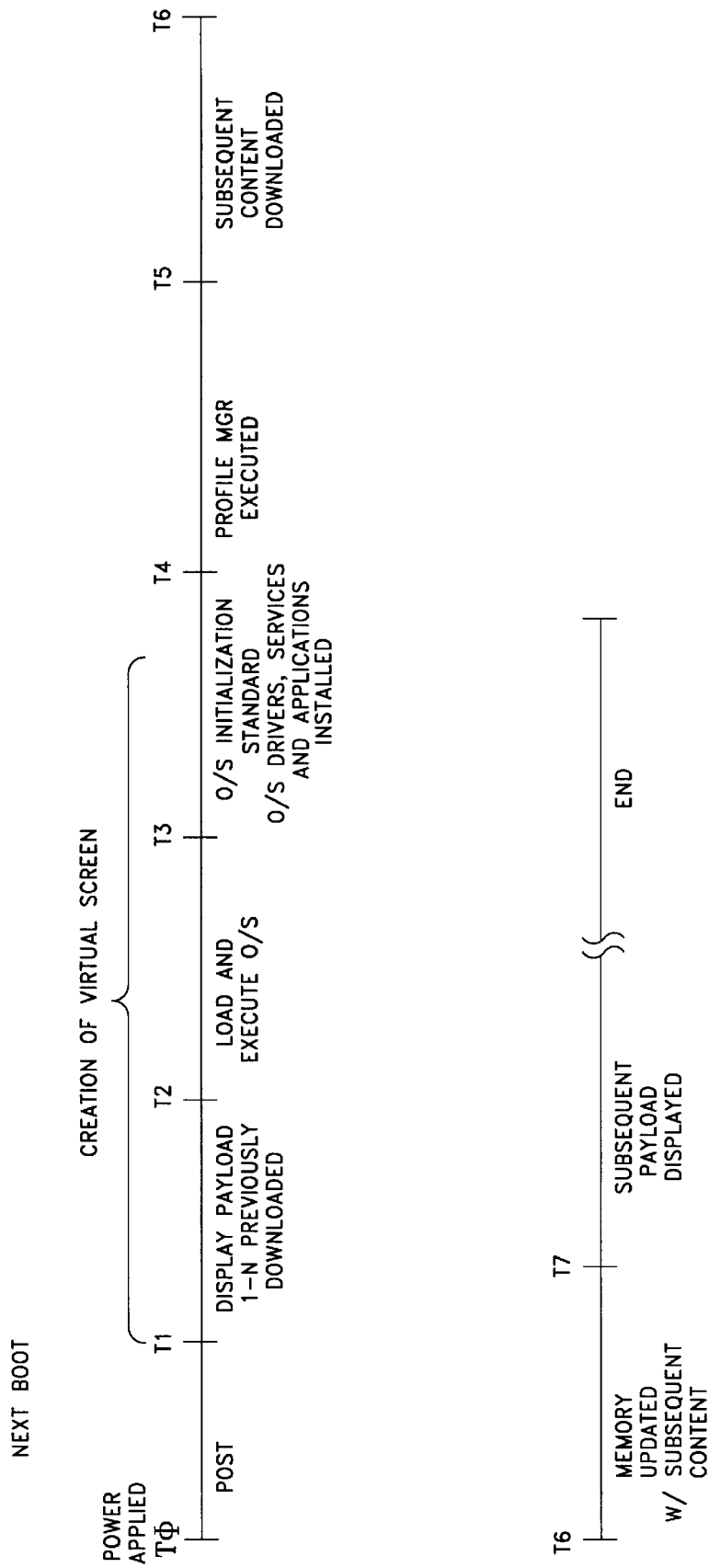

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067 entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. patent Continuation-in-Part application Ser. No. 09/272,859, entitled "Method and Apparatus for Providing Memory-Based Device Emulation" filed on Jun. 18, 1999, and in co-pending U.S. patent application Ser. No. 09/336,281, entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is establish ed. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62*a*, drivers 62*b*, and payloads 62*c*. In one embodiment, the applications 62*a* include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88*b*. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

DETAILED DESCRIPTION

Figure 5:
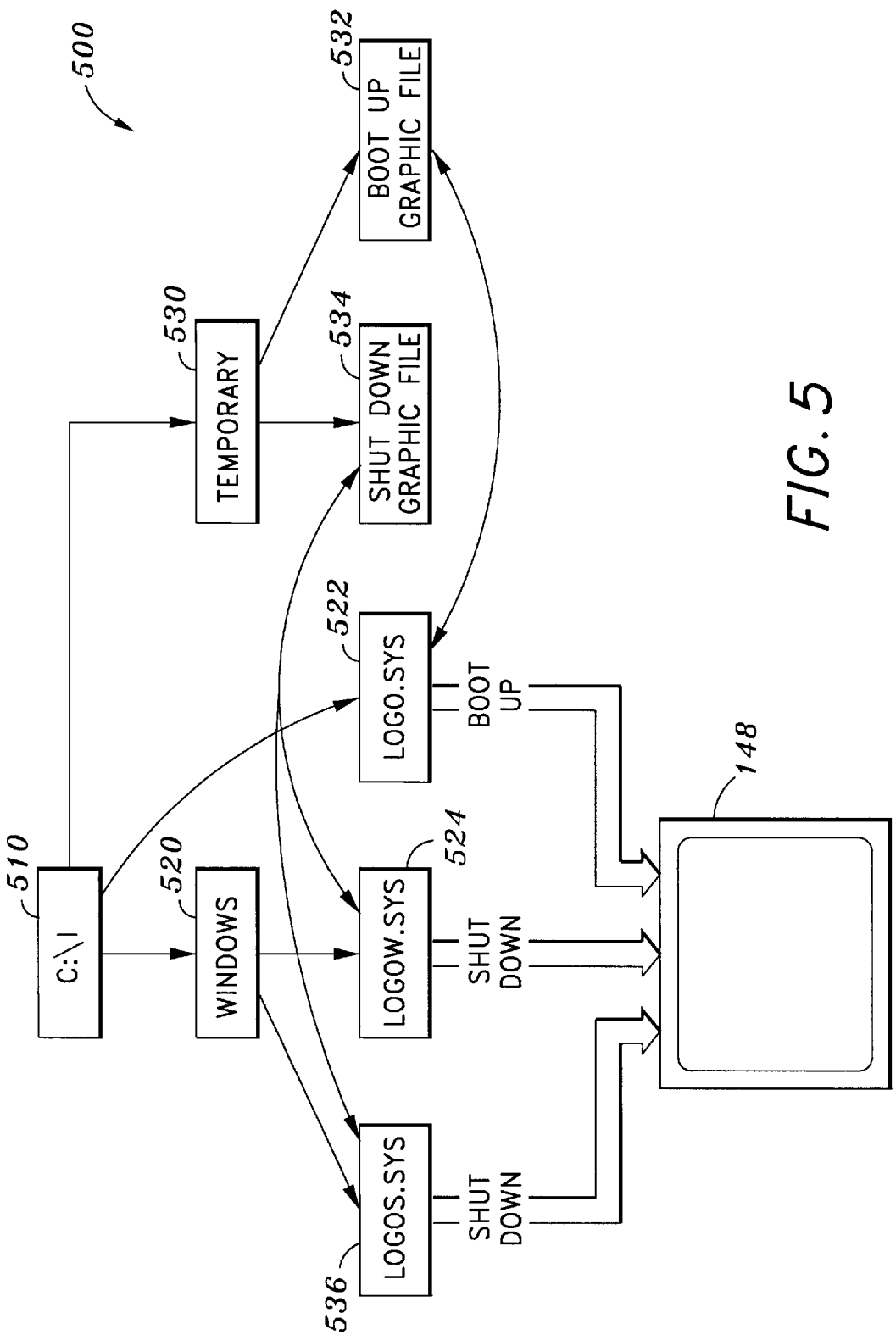
FIG. 5 is a diagram illustrating an architecture to display an image during a transition of the operating system according to one embodiment of the invention.

FIG. 5 is a diagram illustrating an architecture 500 to display an image during a transition of the operating system according to one embodiment of the invention. The architecture 500 includes a root directory 510, a system directory 520, a temporary directory 530, system files 522, 524, and 526, a boot-up graphic file 532, and a shutdown graphic file 534.

The root directory 510 is typically the C:\ drive in the mass storage where the operating system is located. The system directory 520 is typically the directory that stores the operating system that is loaded into the system memory when the BIOS boots up. In one embodiment, the operating system is the WINDOWS operating system and the system directory or folder has the name Windows.

When the BIOS loads the Windows operating system, a input/output program is executed (IO.SYS which is the historical name "input/output" known to people of the trade) and the IO.SYS attempts to locate and load the system files in a default directory, e.g., root directory and Windows. The LOGO.SYS system file 522 is used when the OS is booted up. The LOGO.SYS typically contains a image file that displays the Windows start-up logo.

When the system is shutdown, the Windows operating system retrieves the LOGOW.SYS system file 524 and the LOGOS.SYS system file 526, and displays the appropriate logo images on the screen 148. The LOGOW.SYS system file 524 typically contains the message "Please wait while your computer shuts down". The LOGOS.SYS system file 526 typically contains the message "It is now safe to turn off your computer".

The boot-up graphic file 532 is the file containing an image that is to be displayed during the OS boot-up in place of the LOGO.SYS system file 522. The shutdown graphic file 534 is the file containing an image that is to be displayed during the OS shuts down in place of the LOGOW.SYS system file 524 and the LOGOS.SYS system file 526.

FIG. 6 is a flowchart illustrating a process 600 to display an image during a transition of the operating system according to one embodiment of the invention.

Upon START, the process 600 creates a boot-up graphic file and a shutdown graphic file using a bitmap format (Block 610). Then the process 600 locates and retrieves the original LOGO.SYS, LOGOW.SYS and LOGOS.SYS system files from a system directory and saves them in a temporary directory under different extensions or names so that they can be used later (Block 620).

Then the process renames the created boot-up and shutdown graphic files to LOGO.SYS for boot-up and LOGOW.SYS or LOGOS.SYS for shut-down (Block 630). These renamed files are then transferred to the system directory where the original system files were located (Block 640). The process 600 is then terminated.

In another embodiment, the image to be displayed during boot-up and shutdown can be captured from the graphics memory. The replacement of the Windows startup and shutdown screens has its application within the context of displaying useful information during the Windows OS startup and shutdown or subsequent startups and shutdowns on a PC.

During the firmware initialization (e.g., BIOS POST), a graphics engine generates an image into the standard Video Graphics Adaptor (VGA) as soon the adapter hardware is initialized. The resolution used is 320×400 with 256 colors. The data used to generate the image is contained with the BIOS flash memory. This data is updated regularly by an external program from within the OS.

After the BIOS has initialized the hardware of the hard drive, the graphical data (e.g., palette and bitmap information) is then stored onto the hard drive using code that supports the File Allocation Table (FAT) 16 file system format. This code is independent of the OS but offers the same functionality for writing to the hard drive as the OS. Before writing to the hard drive the code checks the compatibility of the file system and the type of the OS. The location and name of the file in the file system where the graphical data is stored corresponds to the Windows LOGO.SYS file. This file is also stored into the Windows boot directory. The exact path of the Windows directory is extracted from the MSDOS.SYS text file within the root directory of the boot drive. This file contains among other information the string "WinDir=" followed by a directory path. The filenames used under that directory are LOGOW.SYS and LOGOS.SYS.

In Windows95 the first file that is loaded after the bootblock of the hard drive is IO.SYS. This file looks for some file system compression drivers before loading the Windows LOGO graphics file from the root directory of the boot drive. IO.SYS switches the VGA into graphics mode with a resolution of 320×400 and 256 colors. It then loads the logo.sys file that contains a standard Windows Bitmap image. When Windows95 shuts down it displays two other images that are found in the Windows directory under the names LOGOW.SYS and LOGOS.SYS. Windows displays these two images in sequence with no visible interruption between them. Having the same image stored in both files gives the impression of having a single image being displayed.

The pseudo code for this process is as follows:
1. Call graphic engine to render data into the VGA card memory.
2. Identify filesystem and OS on the harddrive. If unsupported types go to step 8.
3. Call screen capture routine to extract image from VGA card and write the image into a temporary Windows Bitmap file.
4. Locate LOGOW.SYS, and LOGOS.SYS on the file system.
5. Copy the temporary Windows Bitmap file into LOGO.SYS that is in the root directory of the boot drive.
6. Copy the temporary Windows Bitmap file into LOGOW.SYS and LOGOS.SYS into the previously located directory.
7. Delete the temporary BMP file
8. Continue with the machine booting process (finish hardware initialization and load OS).

Any error encountered during this process would cause the machine to proceed with the normal booting process in step 8.

FIG. 7 is a flowchart illustrating a process 700 to display an image during a transition of the operating system according to one embodiment of the invention.

Upon START, the process 700 renders graphic data on the graphics memory in the graphics controller or the video display adapter (Block 710). This rendering may be performed as part of a pre-boot graphics display activity, or as part of a normal graphics rendering process after the system boots up. The process 700 identifies the file system and the operating system on the hard drive (Block 715). Then the process 700 determines if the file system or the OS is supported by the technique (Block 720). If not, the process 700 is terminated.

If the file system or the OS is supported, the process 700 extracts the image from the graphic memory (Block 725). This can be achieved by a number of techniques. One simple technique is to use a screen capture program to capture the graphics memory. Then the process 700 writes the extracted image into a temporary file having a format compatible with the operating system (e.g., bitmap) (Block 730). In one embodiment, the operating system is a Windows-compatible OS and the file format is a bitmap format with a resolution of 320×400.

Next, the process 700 locates the system file(s) corresponding to the image or images displayed during the boot-up of shut-down (Block 735). For example, if the OS is a Window-compatible OS, the boot-up system file is LOGO.SYS, and the shut-down system files are LOGOW.SYS and LOGOS.SYS. Then the process 700 copies the temporary bitmap file as created in block 730 to the system directory that stores the corresponding boot-up or shut-down system file (Block 740). Then the process 700 deletes the temporary file, if necessary (Block 745). Next, the process 700 continues the booting process and loading of the operating system (Block 750). Note that if this process is performed at times other than booting up, then activities in block 750 are normal activities of the system. Then the process 700 is terminated.

Thus, the present invention is an efficient technique to display an image during a transition of the operating system. For boot-up, the LOGO.SYS system file is replaced by a boot-up graphic file. For shutdown, the LOGOS.SYS and/or LOGOW.SYS is replaced by a shutdown graphic file. The technique allows displaying images other than the logos from Windows.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to display an image during a transition of an operating system in a computer system, the method comprising:

obtaining the image having an image format compatible with the operating system; and, creating content of a system file using the image, the system file to be accessed during the transition of the operating system, said image to correspond to a user profile.

2. The method of claim 1 further comprising:

saving the system file in a directory.

3. The method of claim 1 wherein the operating system is compatible with a Windows operating system.

4. The method of claim 3 wherein the image format is a bitmap format.

5. The method of claim 4 wherein the image has a resolution compatible with the operating system.

6. The method of claim 1 wherein the transition is a boot-up sequence.

7. The method of claim 6 wherein the system file is a LOGO.SYS file.

8. The method of claim 1 wherein the transition is a shut-down sequence.

9. The method of claim 8 wherein the system file is one of a LOGOW.SYS file and a LOGOS.SYS file.

10. The method of claim 2 wherein the directory is located on a storage compatible with the operating system.

11. A computer program product, comprising:

a computer usable medium having computer program code embodied therein to display an image during a transition of an operating system in a computer system, the computer program product having:

computer readable program code for obtaining an image having an image format compatible with the operating system; and computer readable program code for creating content of a system file using the image, the system file to be accessed during the transition of the operating system, said image to correspond to a user profile.

12. The computer program product of claim 11 further comprising:

computer readable program code for saving the system file in a directory.

13. The computer program product of claim 11 wherein the operating system is compatible with a Windows operating system.

14. The computer program product of claim 13 wherein the image format is a bitmap format.

15. The computer program product of claim 14 wherein the image has a resolution compatible with the operating system.

16. The computer program product of claim 11 wherein the transition is a boot-up sequence.

17. The computer program product of claim 16 wherein the system file is a LOGO.SYS file.

18. The computer program product of claim 11 wherein the transition is a shut-down sequence.

19. The computer program product of claim 18 wherein the system file is one of a LOGOW.SYS file and a LOGOS.SYS file.

20. The computer program product of claim 12 wherein the directory is located on a storage compatible with the operating system.

21. A computer data signal embodied in a carrier wave comprising:

a graphic display code segment to display an image during a transition of an operating system in a computer system, the graphic display code segment comprising:

an image obtaining code segment for obtaining an image having an image format compatible with the operating system; and a content creation code segment for creating content of a system file using the image, the system file to be accessed during the transition of the operating system, said image to correspond to a user profile.

22. The computer data signal of claim 21 wherein the graphic display code segment further comprising:

a save code segment for saving the system file in a directory.

23. The computer data signal of claim 21 wherein the operating system is compatible with a Windows operating system.

24. The computer data signal of claim 23 wherein the image format is a bitmap format.

25. The computer data signal of claim 24 wherein the image has a resolution compatible with the operating system.

26. The computer data signal of claim 21 wherein the transition is a boot-up sequence.

27. The computer data signal of claim 26 wherein the system file is a LOGO.SYS file.

28. The computer data signal of claim 21 wherein the transition is a shut-down sequence.

29. The computer data signal of claim 28 wherein the system file is one of a LOGOW.SYS file and a LOGOS.SYS file.

30. The computer data signal of claim 22 wherein the directory is located on a storage compatible with the operating system.

31. A system comprising:

a processor; and a memory coupled to the processor, the memory containing program code to display an image during a transition of an operating system, the program code when executed by the processor causing the processor to:

obtain the image having an image format compatible with the operating system, and create content of a system file using the image, the system file to be accessed during the transition of the operating system, said image to correspond to a user profile.

32. The system of claim 31 wherein the program code when executed by the processor further causing the processor to:

save the system file in a directory.

33. The system of claim 31 wherein the operating system is compatible with a Windows operating system.

34. The system of claim 33 wherein the image format is a bitmap format.

35. The system of claim 34 wherein the image has a resolution compatible with the operating system.

36. The system of claim 31 wherein the transition is a boot-up sequence.

37. The system of claim 36 wherein the system file is a LOGO.SYS file.

38. The system of claim 31 wherein the transition is a shut-down sequence.

39. The system of claim 38 wherein the system file is one of a LOGOW.SYS file and a LOGOS.SYS file.

40. The system of claim 32 wherein the directory is located on a storage compatible with the operating system.

41. The method of claim 1, wherein said image corresponds to data stored in a BIOS memory.

42. The method of claim 41, wherein said data is updated during execution of said operating system.

43. The method of claim 1, wherein creating content of a system file comprises creating content of a system file during said transition using the image.

44. The method of claim 1 wherein creating content of a system file comprises creating content of a system file before said transition using the image.

45. The method of claim 31, wherein said program code further causes said processor to generate said image corresponding to data stored in a BIOS memory, said image to be generated during the transition.

* * * * *